United States Patent
Martel et al.

(10) Patent No.: US 8,326,786 B1
(45) Date of Patent: Dec. 4, 2012

(54) METHOD AND APPARATUS FOR FINDING ORDER IN A TIME SERIES OF IMAGES USING GRENZE SETS COMPRISING A PLURALITY OF GRADIENT RUNS AND VOCABULARY ELEMENTS

(75) Inventors: Thomas Martel, Manliys, NY (US); John T. Freyhof, Cambridge, MA (US)

(73) Assignee: Vy Corporation, Wayne, PA (US)

( * ) Notice: Subject to any disclaimer, the term of this patent is extended or adjusted under 35 U.S.C. 154(b) by 720 days.

(21) Appl. No.: 12/487,476

(22) Filed: Jun. 18, 2009

Related U.S. Application Data (63) Continuation-in-part of application No. 12/012,863, filed on Feb. 5, 2008, now abandoned.

(60) Provisional application No. 61/132,676, filed on Jun. 19, 2008.

(51) Int. Cl.
*G06F 15/00* (2006.01)

(52) U.S. Cl. .................................................. 706/45

(58) Field of Classification Search .................... 706/12, 706/45, 62
See application file for complete search history.

(56) References Cited

U.S. PATENT DOCUMENTS

| | | | | |
|---|---|---|---|---|
| 5,341,142 A | * | 8/1994 | Reis et al. ........................ | 342/64 |
| 5,552,825 A | * | 9/1996 | Talluri et al. ................ | 348/222.1 |
| 2007/0041638 A1 | * | 2/2007 | Liu et al. ....................... | 382/170 |

* cited by examiner

*Primary Examiner* — David Vincent
(74) *Attorney, Agent, or Firm* — Neal Blibo LLC (57) ABSTRACT

An apparatus and method is disclosed for acquiring an electronic image and forming at least one Grenze Set including pixels of the electronic image. A decision tree is used to apply vocabulary and rules associated with a primitive to evaluate pixels of the Grenze Set. The pixels of the Grenze Set are explained by re-building the Grenze Set using a set of sub-primitives. Higher order analysis are applied to the Grenze Set according to a ladder of abstraction to assemble pixels into at least one of objects or activities that are meaningful to a user.

25 Claims, 6 Drawing Sheets

METHOD AND APPARATUS FOR FINDING ORDER IN A TIME SERIES OF IMAGES USING GRENZE SETS COMPRISING A PLURALITY OF GRADIENT RUNS AND VOCABULARY ELEMENTS

CROSS REFERENCE TO RELATED APPLICATIONS

This application claims the benefit of U.S. Provisional Patent Application No. 61/132,676 filed Jun. 19, 2008, entitled, "Finding Order in a Time Series of Images" by Thomas Martel and John Freyhof, and is a continuation-in-part of U.S. patent application Ser. No. 12/012,863 filed Feb. 5, 2008 now abandoned, entitled, "Codification of a Time Series of Images" by Thomas Martel and John Freyhof, the contents of the above referenced applications are hereby incorporated by reference.

FIELD OF THE INVENTION

The present invention relates to the identification of objects and activities within electronically acquired imagery, and more specifically, to organizing an image into meaningful groups of pixels from which descriptive data can be obtained about objects and/or activities.

BACKGROUND OF THE INVENTION

Images may be obtained from a camera, the Internet or another source and stored as electronic data. In order for a user to identify shapes as they appear in still or moving images, the pixels associated with the electronically acquired data must be analyzed and the shapes identified.

SUMMARY

Embodiments of the present invention may be directed to characterizing and searching a time series of images using decision trees for the purpose of identifying objects and activities based upon at least one of shape, position or movement. Embodiments of the invention may be applied to images including video schematics which include a collection of abstract attributes that are related spatially and temporally.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF EMBODIMENTS

Methods, systems, and other aspects of the invention are described in more detail below. Reference will be made to certain embodiments of the invention, examples of which are illustrated in the accompanying drawings. While the invention will be described in conjunction with the embodiments, it will be understood that it is not intended to limit the invention to these particular embodiments. On the contrary, the invention is intended to cover alternatives, modifications and equivalents that are within the spirit and scope of the invention. The specification and drawings are, accordingly, to be regarded in an illustrative rather than a restrictive sense. Moreover, in the following description, numerous specific details are set forth to provide a thorough understanding of the invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

According to certain embodiments, electronic representations of an image obtained from a source, such as a camera or the Internet, may be stored as pixels. A gradient may be a plurality of neighboring pixels arranged in a line or pixel sets from other geometrical shapes, such as open or closed curves or polygons. A set of pixels constituting a gradient can be thought of as a single one-dimensional entity, whether that one-dimensional gradient set is arranged as a straight line segment, as a curve, or in some other arrangement. Such one-dimensional gradient set of neighboring pixels may be referred to as a "gradient run".

In order to address images having objects including two-dimensional arrays of pixels, two-dimensional gradient representations of information-bearing regions of the electronically-acquired imagery may be used. According to certain embodiments, such two-dimensional gradient representations may include a plurality of gradient runs and may be referred to as Grenze Sets. Thus, a Grenze Set may include a plurality of gradient runs that are adjacent to one another. A second order of grouping may be created in which the gradient runs are themselves grouped into larger collections. A criterion by which the first-order gradient pixel groups may be assembled into second-order gradient pixel groups may be that of proximity. The "second order gradient pixel groups" may also be referred to as Grenze Sets.

The gradient runs may include collections of adjacent pixels whose brightness is monotone, that is steadily and without interruption, increasing or decreasing. Each gradient run may also continue through those adjacent pixels exhibiting a "flat," or unchanging brightness value. The first pixel of the gradient run may be one having brightness which differs from its immediate neighbor by an amount greater than a predetermined threshold. The last pixel of the gradient run may be that pixel which is the first to interrupt the brightness trend, whether it be increasing or decreasing, by going against this trend. Whether or not those pixels which exhibit a "flat" or unchanging, brightness value over some spatial interval are included within the set of pixels constituting a given gradient run may be optional. The concept of the gradient run can be applied to the separate color components that are co-located and superimposed, as is the case in multi-colored electronically acquired imagery. In such multi-colored electronically acquired imagery, there may be occasions in which second order gradient pixel groups may form in one color but not in others, depending upon the hue and shade of the subject material depicted in the electronically acquired image.

In order to identify/discover a target object in an image, the level of the detailed description of the physical characteristics of the target object may determine the specificity of identification of the target object. The more detailed the description, the higher the probability of an accurate discovery of the target object. A good description of the target object may include a multiplicity of primitives, a group of pixels that taken together include a single indivisible component of order that can be used to define more complex shapes. Non-limiting examples of primitives may include a group of pixels included in a shape, such as a smile, line, corner, arc, circle or curve. An ordered collection of primitives may correspond to a description of the target object. Primitives can be ranked in order of salience. The first primitive ranked in descending order of salience is called the anchor primitive. As a non-limiting example, the anchor primitive may be the largest primitive. The appearance of the anchor primitive will be relatively invariant. Another non-limiting example of an anchor primitive may be a primitive that has a distinctive shape and/or color. In other words, a primitive may be selected as an anchor primitive based on some figure of merit determination, such as signal-to-noise ratio, for example. A multi-dimensional object may have more than one anchor primitive.

Examples of primitives used in certain embodiments include a curve primitive, a point primitive, and/or an angle primitive. It should be apparent to one skilled in the art that other kinds of primitives may be used in embodiments of the invention. The curve primitive is one type of extended primitive(s) that serves to connect widely separated areas of the image. The curve primitive may be based on a line connecting two points defined by "point primitives," of which the angle primitive is an example.

Figure 1:
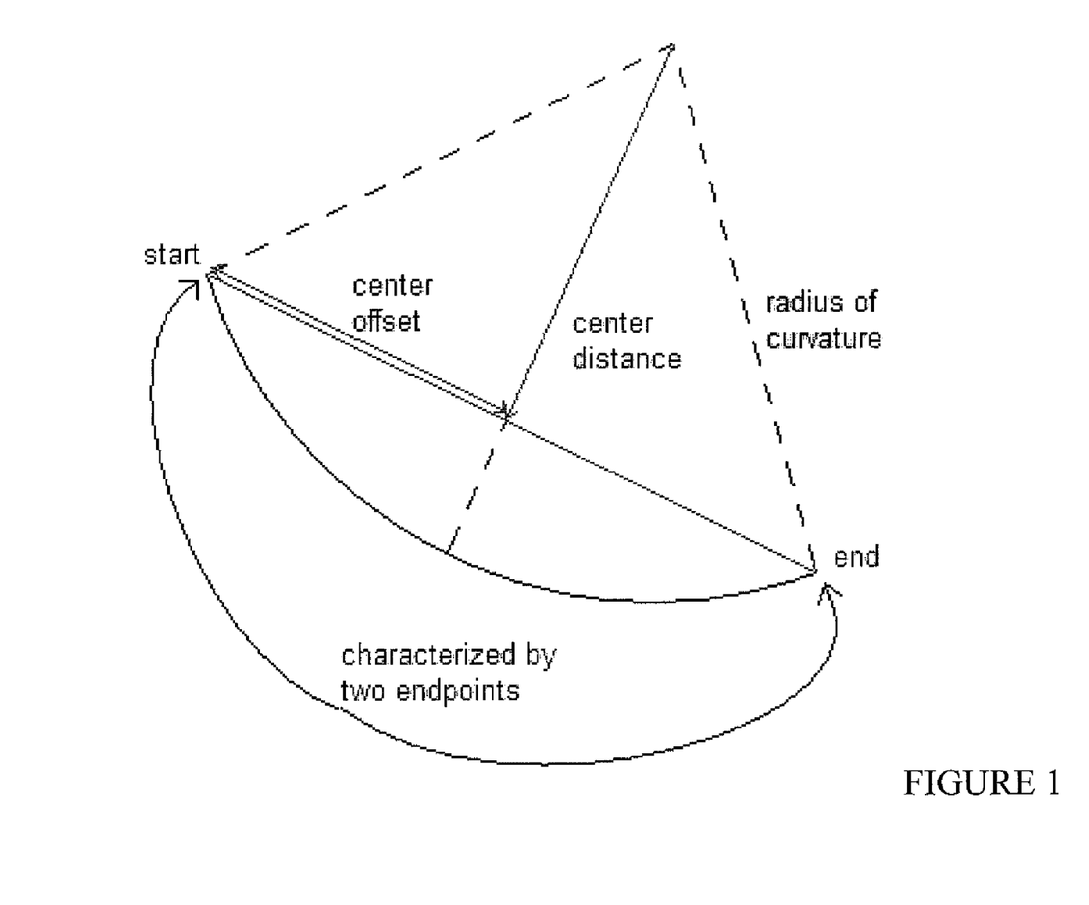
FIG. 1 illustrates a curve primitive schematic based on a circular arc.

FIG. 1 illustrates a curve primitive schematic based on a circular arc. A more general curve primitive could be based on an ellipse. Each curve primitive element may be associated with a range of local radii of curvature. Subsequent transitions and primitives may function either to narrow the range of radii, or cause the range of radii to "walk away," trending in one direction or another, that is, toward larger or smaller radii. While curve element primitives are each associated with a lower limit for radius, an upper limit may be associated with a chain of nodes defined as components of a decision tree that, taken together, represent every possible hypothetical interpretation of a subject of interest, for example, curve primitives. Specifically, the upper limit may be associated with endpoint angles and the smoothness and shape of the contour linking the endpoints.

The angle primitive fills a role complementary to that of a "smile" primitive, that is, the angle primitive is localized, whereas smile primitive is "distributed" over space. The angle primitive is necessary to link curves into complex shapes, shapes that are made up of curve primitives and angle primitives. There are two broad categories of angle primitives: punctuated and non-punctuated. Punctuated angle primitives may be formed within a single Grenze Set and may be discovered on the basis of smoothness or continuity. Non punctuated angle primitives may be discovered by the proximity of two or more discrete Grenze Sets. Angle primitives are inherently scale and angle invariant. The angle primitive may link (or "clip") two different Grenze Sets or punctuate a single Grenze Set.

According to certain embodiments, a multiplicity of primitives within any given image can be discovered using a scheme. Such a scheme may resemble a decision tree structure in which the local interpretation of each primitive may be validated in terms of its context within the larger schematic. A decision tree scheme for interpreting primitives of an image may apply to physical elements of at least one of a finite descriptive vocabulary, a finite set of transition rules, and an ordering axis, to determine descriptive data about certain objects or activities. Physical elements arise from actual physical measurements of an image and include the pixels of the image. Error correction can be performed on the pixel elements (these can be gradient runs) of a given primitive if, for example, one or more of the pixel-scale elements of the given primitive element is out of place. The physical elements may be repairable, for example, using a-priori information arising from an earlier analysis point in the decision tree. The a-priori information may be obtained from an earlier analysis of a deterministic path, from another region of the image resulting from symmetry considerations or resulting from periodicity considerations, or from an earlier frame of a time series of images. The physical elements may also be reparable by brute-force search, that is to say, allowing the decision tree to branch out using different assumptions for the true identity of the erroneous pixel-scale elements. Because these are "atomic" elements, there will usually be only a few possible interpretations for the error.

The finite descriptive vocabulary may be used as an important filtering mechanism for limiting the scope of the computational task. Vocabulary elements describe specific conditions at a specific location in a frame or image and are "atomic," or indivisible. Vocabulary elements are the end of the line in terms of logic, or in terms of a logical chain of inference.

The finite set of transition rules may correspond to the large scale structure of the objects of interest. Transition rules/grammar may describe large-scale evolution of shapes, boundary lines, objects, and elements. The transition rules may explain how causal elements at one location may have an "effect" at another location. The transition rules may serve to define continuity as it is expressed over a scale of many pixels and many primitives. Transition rules may define "punctuation", that is, conditions under which continuity is broken. A punctuation primitive may serve as a "point" primitive. A physical (spatial) branch point is typically a candidate punctuation point.

At the grammar level, error correction may include trying out different large-scale interpretations of an underlying image feature naming assignment. These different large-scale interpretations are, for example, expressed by allowing multiple branches of the tree search to propagate until they either resolve or prune due to information encountered elsewhere in the image, or in another frame.

Decision trees implemented in embodiments of the invention may apply transition rules/grammar based upon a-priori knowledge of the activities or objects of interest. The decision trees may then be used to identify the position and movement of particles/objects that match certain criteria. Certain embodiments may aim to discover a feature or object by implementing the decision tree method involving a ladder of abstraction, a hypothetical continuum with pixels at one end and a symbol/particle at the other end. Implementing the ladder of abstraction may involve a dynamic exchange of information between large-scale analysis and small scale analysis, where the large-scale analysis may restrict the number of possible interpretations of small scale elements. The identification of small-scale elements may corroborate the validity of the interpretation of large-scale elements. Higher levels of abstraction may be dependent upon correct decisions being made earlier on the continuum. The ability to move up and down the ladder of abstraction may be essential to making correct decisions.

The starting point of the ladder of abstraction may involve obtaining pixels associated with physical measurements of the image. Higher up the ladder of abstraction, more information may be discovered, such that the information obtained higher up the ladder of abstraction are more general in nature, cover more ground physically, in terms of pixels or territorial space, or intellectually, in terms of conceptual categories. As a rule, the creation of order may result from an upward motion, a "climb" up the ladder of abstraction. Movement up the ladder of abstraction may involve a-priori information and may be seen as a way of organizing, or expressing, a-priori information so that the appropriate a-priori information is combined with the appropriate measurement, or set of measurements, at the right time, or in the correct context.

Sometimes, however, a beneficial result can be achieved by climbing back down the ladder of abstraction by a process called "abstraction step-down." Abstraction step-down is one of the ways that large scale analysis may guide the identification of small elements. For particle detection, where particles are defined as objects having non complex boundary lines that reveal little or nothing about their nature based upon their shape or coloring, abstraction-step-down may serve as an analytical technique that allows the decision tree method to test for the presence of a particle with only one shape detected. In the abstraction step-down process, more physical, less abstract elements of the image are "promoted by association" before their identity can be resolved by other means. In this way, abstraction step-down may be a powerful tool for achieving robustness.

Promoting by association can also be accomplished by means of other, more abstract associative characteristics or parameters, such as continuity of motion, similarity of velocity or trajectory, or by relative position with respect to some virtual shape or template, for example a straight line connecting two other known points of the putative object being identified. Continuity of motion may refer to the circumstance in which a given feature is identified in frames, for example frame N and frame N+2, of a video stream, but not in frame N+1. In other words, appearance variables conspire to prevent detection of an already discovered feature in frame N+1. If that object is moving in the frame, either as a result of the movement of the camera or because of literal movement of the corresponding real-world object, and if the movement is seen in the position of the point feature (or primitive) in frames N and N+2, then linear interpolation could be used to promote an imperfectly identified feature corresponding to that object by "continuity of motion", that is, interpolation.

Similarity of velocity might be used to identify elements of a set of separate things, such as vehicles in a convoy, or fish in a school, or birds in a flock, that are moving in a coordinated manner. If there are 100 birds in a flock, but only, say, half of them can be identified as birds by explicit, literal discovery of bird-like features (wings flapping, etc.) the identification of the balance of the members of the flock could be inferred by proximity and continuity of motion of those particles which, though they don't at that moment, at that frame, reveal enough detail to be literally identified as birds, are nonetheless within the boundary of the flock, have the right approximate size, color density, movement, etc. Note that this is an actual application of the power of context.

Promoting by association by relative position with respect to some virtual shape or template is an application of the concept, in which landmark primitives or elements are used to orient a more complex "template" or "guide shape," expressed in the computer as a set of coordinates, line segments, cubic splines, or by any other means. Having so oriented the template, other non-qualifying images elements that nonetheless fit the template in terms of their positions, velocities, trajectories, optical density, or coloration are "promoted to identity" as a result of their fit to the template.

The promoting by association concept can be extended by another order by going beyond simply promoting a non-qualifying primitive. This could be done by reaching to the next level down, and, for instance, adjusting the gradient run trigger threshold to reveal a feature that has been obscured, or partially obscured, by an appearance variable such as a shadow.

Figure 2:
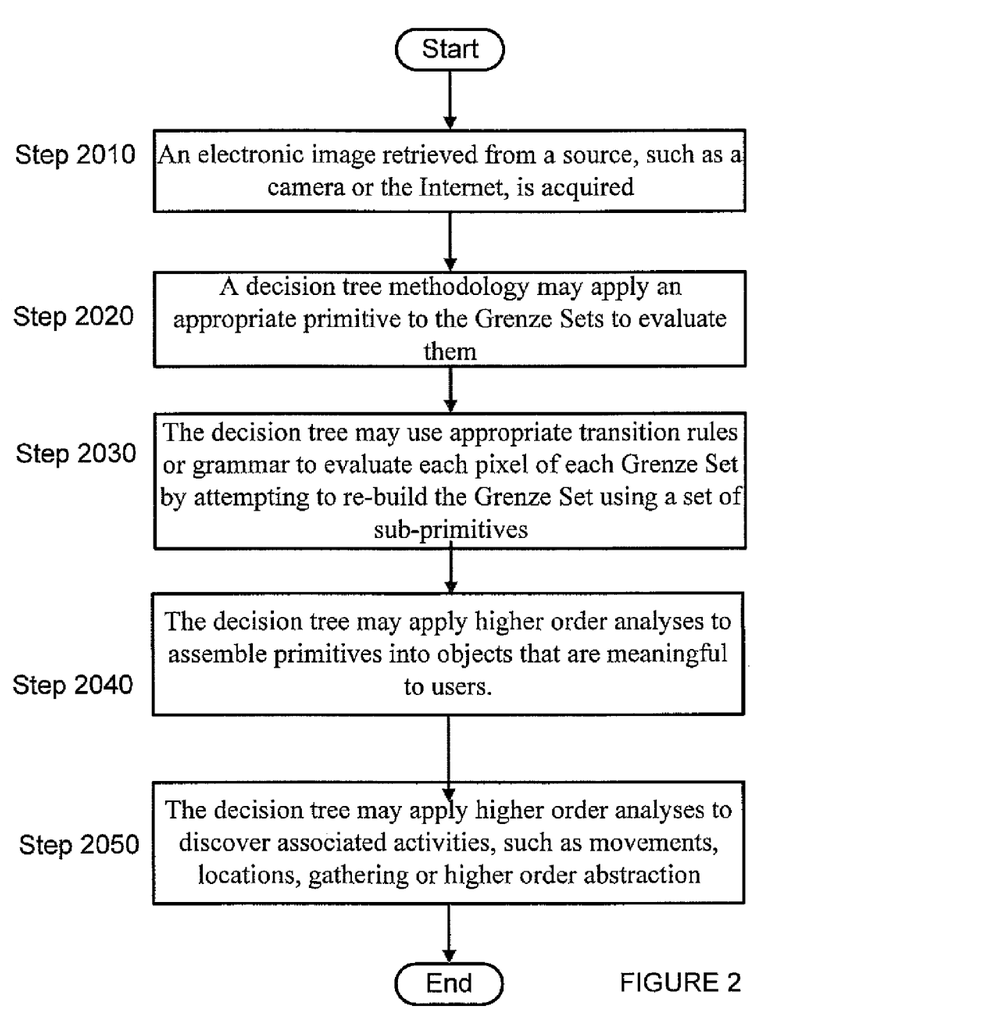
FIG. 2 illustrates an implementation of an embodiment of the invention.

FIG. 2 illustrates an implementation of an embodiment of the invention. In Step 2010, an electronic image retrieved from a source, such as a camera or the Internet, is acquired. For example, pixels representing the image may be obtained and de-colored, if necessary. Gradient runs may be formed by evaluating pixel brightness trends and Grenze Sets may be formed by assembling gradient runs into on the basis of their mutual proximity. The formed gradient runs and Grenze Sets may be stored in corresponding databases. In Step 2020, a decision tree methodology may apply an appropriate primitive to the Grenze Sets to evaluate them. In Step 2030, the decision tree may use appropriate transition rules or grammar to evaluate each pixel of each Grenze Set by attempting to re-build the Grenze Set using a set of sub-primitives. Any necessary error corrections may be performed and this process may be used to determine the best set of sub-primitives arranged to fit the original Grenze Set. The determined sub-primitive, such as a smile, curve, or angle, is stored in an associated database. During this process, if it is determined that some pixels of the Grenze Set do not conform to the applied rules, these pixels may be omitted from the primitive. This has the effect of punctuating the Grenze Set by dividing it into one or more sets of pixels that can be explained as a certain shape and one or more sets of pixels that cannot fit into the shape. In Step 2040, the decision tree may apply higher order analyses to assemble primitives into objects that are meaningful to users. Examples of the object may be people, vehicles or weapons. The process of assembling primitives into objects that are meaningful to users results in making choices about which primitives may be associated with other primitives. These choices constitute error correction because they describe gaps between primitives that, for reasons related to camera optics or appearance variables, are distinct, but associated because they form the boundary of a connected object. In Step 2050, the decision tree may apply higher order analysis to discover associated activities, such as movements, locations, gathering or higher order abstraction.

Figure 3:
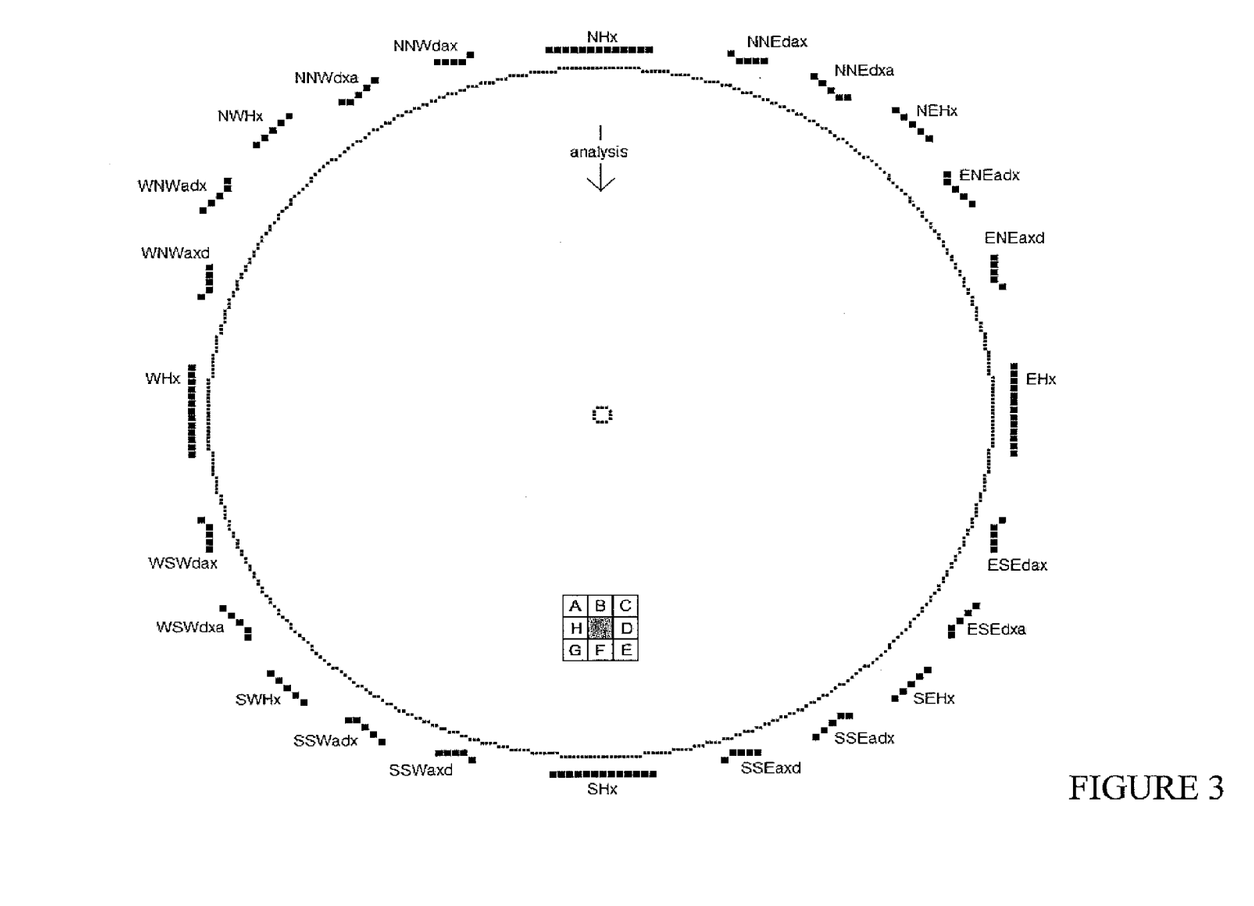
FIG. 3 illustrates an example of a circle element that includes curve primitives for detecting a curve.

FIG. 3 illustrates an example of a circle element that includes curve primitives for detecting a curve. The circle element includes a vocabulary and rules for unambiguously identifying each valid element of a smooth curve. The decision tree method applies the vocabulary associated with the circle element to determine whether a curve can be explained by certain primitives and implements transition rules for governing which vocabulary members (primitives) can follow a given primitive. The vocabulary for this example includes three basic "words": ad or "adjacent diagonal", da or "diagonal adjacent", and H or "hat". Adjacent diagonal means the next pixels in the image are adjacent first and then diagonal and diagonal adjacent means the next pixels in the image are diagonal first and than adjacent. Hat means the next set of pixels are shaped like a "hat". Each of these three sub-primitives can be qualified by one of the 16 compass-rose directions, as follows: for "ad" and "da": NNE, ENE, ESE, SSE, SSW, WSW, WNW, NNW and for "H": N, S, E, W, NE, NW, SE, SW. In addition, each sub-primitive has one degree of freedom, expressed as a length, where "adx" means the next pixels are adjacent by one length and diagonal by "x" length, "axd" means the following pixels are adjacent to the current pixel by "x" length and diagonal by one length, and "dax" means the following pixels are diagonal by one length and adjacent by "x" length.

The path, series of transitions, and set of vocabulary elements selected by the decision tree, determines whether a given Grenze Set is: a "continuous" or "sufficiently smooth" curve, a section of a circle or an ellipse, or a specific shape, such as the initial 'C' of the Coke™ logo, an element of a human face or element of a vehicle.

Each curve can be represented by more than one sequence of sub-primitives, depending on, for example, direction because different starting points will result in different primitive representations. The basis set of primitives is an attempt to get to a basis that will minimize ambiguity.

Figure 4:
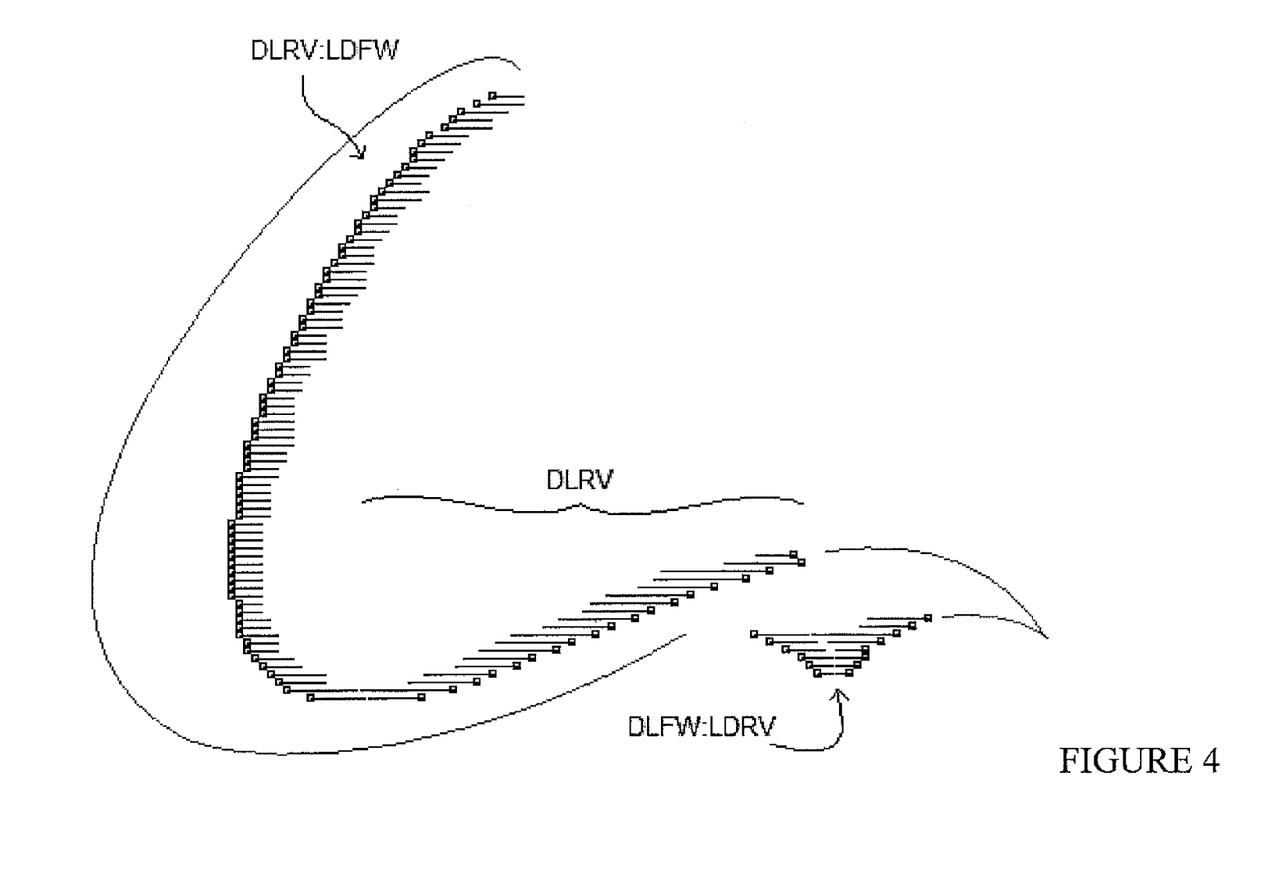
FIG. 4 illustrates application of the curve primitive on the Coke™ Logo.

FIG. 4 illustrates application of the curve primitive on the Coke™ Logo. The left big "C" is one of the characteristic anchor features of the Coke™ logo. Much of the left big "C" is isolated from other elements of the logo and it contains considerable detail that is discernable even at intermediate levels of resolution. FIG. 4 illustrates a partial morphology of the left big "C". This figure shows two pairs of "clipped" Grenze Sets: the large one is a "curve" element and the small one is an "angle" element.

Figure 5:
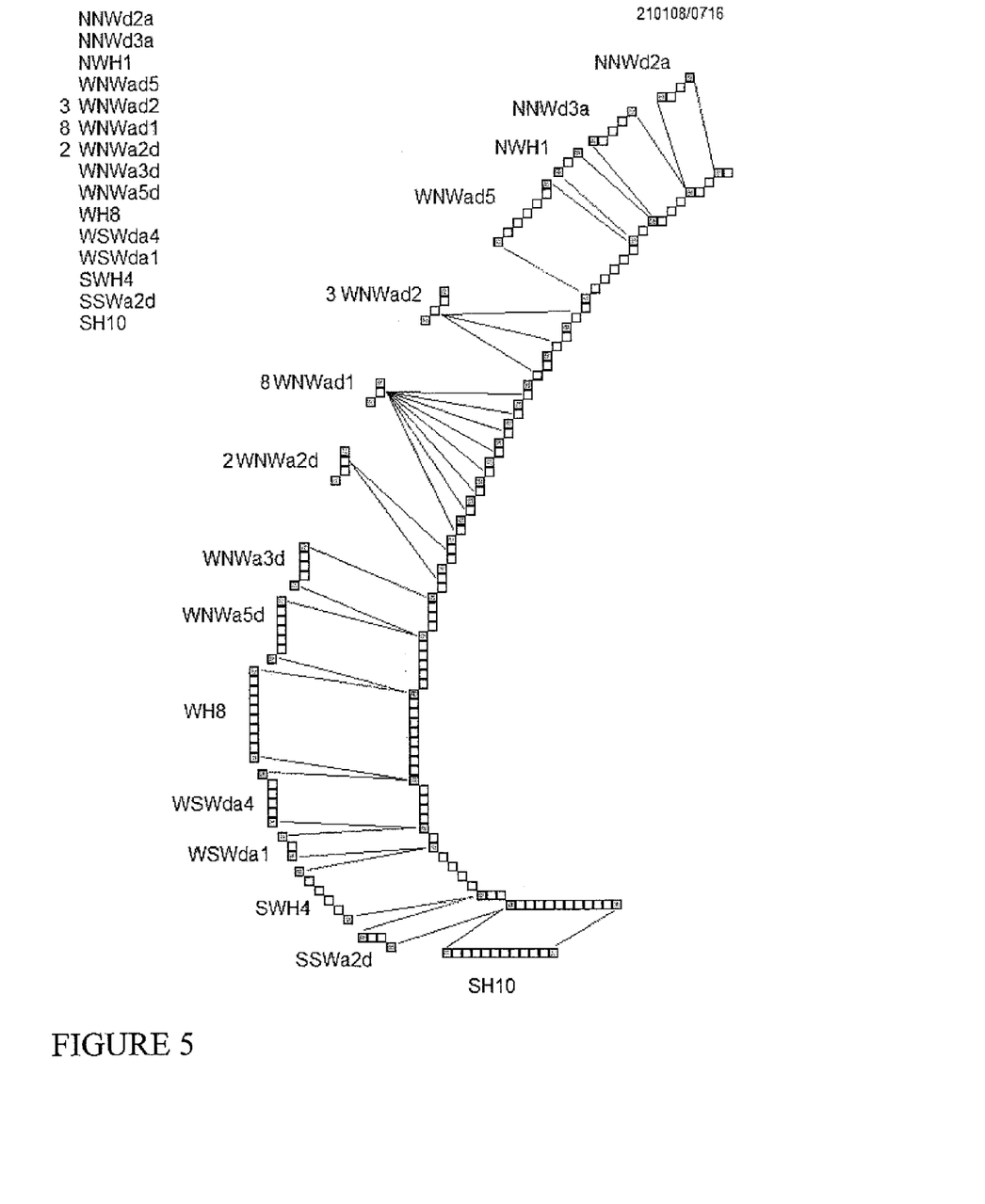
FIG. 5 illustrates an analysis of the curve primitive using vocabulary of the circle element of FIG. 3.

FIG. 5 illustrates an analysis of the decision tree using the vocabulary of the circle element of FIG. 3. The starting point A is ignored and the vocabulary list on the left side of FIG. 5 is used to analyze the left big "C" of the logo.

The decision tree method may use a Shape of Shape (SOS) method to analyze a geometric shape obtained from the analysis of an object or activity. Relative inter-relationship between nodes or connection between nodes may provide the basis for this analysis. Shapes of these relationships can provide important information about the data structure. The SOS method may use the same shape characterization method used to analyze pixels, but at a higher level on the ladder of abstraction. This method is important to move up the ladder of abstraction and provides more generalized information without losing the fundamental nature of the underlying data. The tree search method may be used because tree structures are inherently geometrical and have "shape".

Thus, according to certain embodiments, the shape recognition/characterization method could be applied recursively to a tree structure arising from a physical image, to interpret this structure as a geometrical entity rather than as an abstract mapping of related symbols. This produces a unique sort of "all around" recursion, in which the most abstract characteristics of the data structure produced as a consequence of analyzing shapes as they arise in a physical image would themselves be subjected to analysis of the same order or type. One skilled in the art will recognize that that the SOS recursion process could be applied repeatedly, producing, if possible, even higher orders of shape abstraction. SOS recursion may be seen as a mechanism for moving to the left on the ladder of abstraction.

Higher order activities, such as video search using decision trees, involve the ability to identify and relate fixed and moving particles across many frames. According to certain embodiments, the coordinated movement of particles over many frames can be used to identify and name activities and sub-activities using decision trees. Indexes to search for an image or a series of images can be created by naming desired objects and activities. This allows for the creation of data for search and retrieval of a single image or a series of images based on defined names, objects, or activities. Data, such as date, time, location, speed detection information, global positioning information, geospatial information, inertial guidance information, situational intelligence information, and data arising from electronic sources, can be used to search an image or series of images in conjunction with lower and higher-order data assembled using decision trees.

Figure 6:
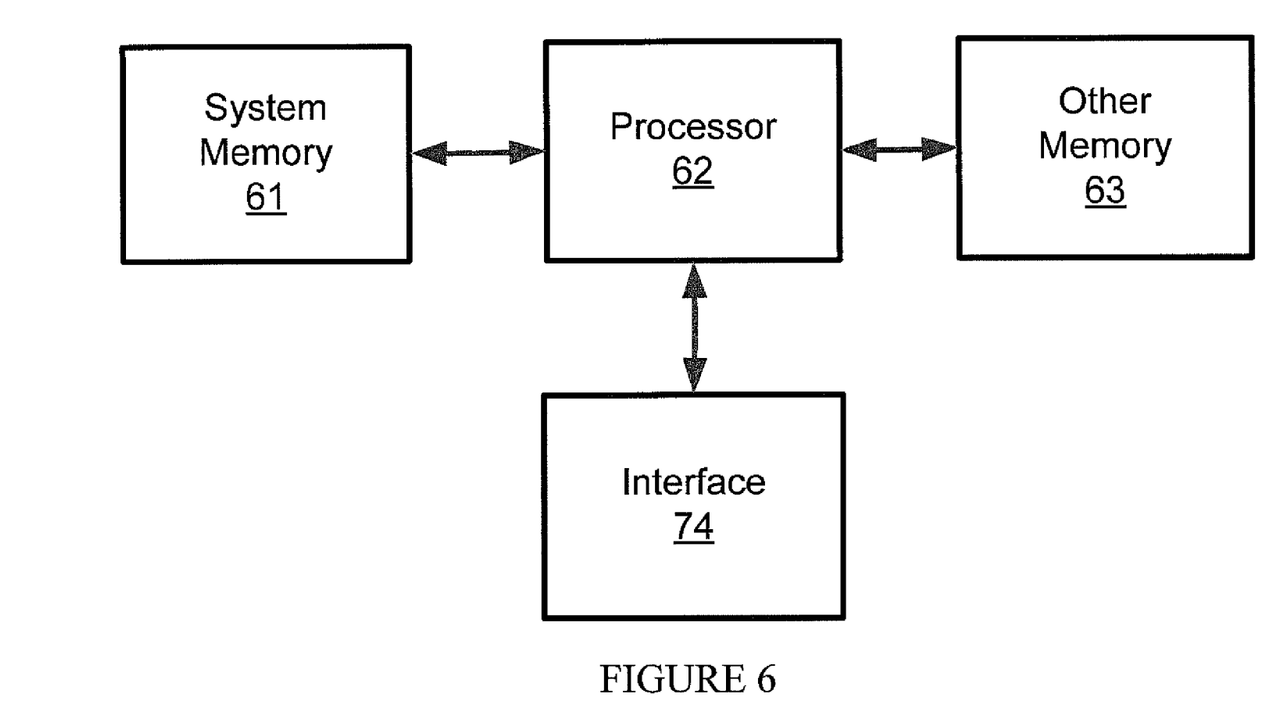
FIG. 6 illustrates an exemplary system that may be used to implement various forms and/or portions of embodiments of the invention.

Various embodiments of the invention may include hardware, software, and/or firmware. FIG. 6 illustrates an exemplary system that may be used to implement various forms and/or portions of embodiments of the invention. Such a computing system may include one or more processors 62, which may be coupled to one or more system memories 61. Such system memory 61 may include, for example, RAM, ROM, or other such machine-readable media, and system memory 61 may be used to incorporate, for example, a basic I/O system (BIOS), operating system, instructions for execution by processor 62, etc. The system may also include further memory 63, such as additional RAM, ROM, hard disk drives, or other processor-readable media. Processor 62 may also be coupled to at least one input/output (I/O) interface 74. I/O interface 74 may include one or more user interfaces, as well as readers for various types of storage media and/or connections to one or more communication networks (e.g., communication interfaces and/or modems), from which, for example, software code may be obtained. Such a computing system may, for example, be used as a platform on which to run translation.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. A method, comprising:
   acquiring an electronic image and forming at least one Grenze Set including pixels of the electronic image;
   applying vocabulary elements and rules associated with a primitive using a decision tree to evaluate pixels of the Grenze Set;
   explaining pixels of the Grenze Set by re-building the Grenze Set using a set of sub-primitives; and
   applying higher order analyses to the Grenze Set according to a ladder of abstraction to assemble pixels into at least one of objects or activities that are meaningful to a user.

2. The method of claim 1, wherein forming at least one Grenze Set comprises forming gradient runs by evaluating pixel brightness trend and assembling the gradient runs into the Grenze Set based on a predetermined criterion.

3. The method of claim 1, wherein the explaining comprises performing error corrections on the Grenze Set and determining a set of sub-primitives arranged to best fit the Grenze Set.

4. The method of claim 3, wherein the performing error correction comprises omitting pixels from the primitive that do not conform to applied rules, wherein a resulting Grenze Set is punctuated and divided into at least one set of pixels that can be explained as a certain shape and at least one set of pixels that do not fit into the shape.

5. The method of claim 1, wherein the applying comprises selecting whether a primitive is to be associated with another primitive.

6. The method of claim 1, wherein the rules describe a valid combination of elements of the vocabulary and an ordering axis along which analysis is to proceed.

7. The method of claim 1, wherein the rules correspond to a large scale structure of an object of interest.

8. The method of claim 1, wherein the acquiring further comprises determining physical elements of the image from physical measurements of the image, the physical elements including pixels of the image.

9. The method of claim 1, wherein vocabulary elements describe specific conditions at a specific location in a frame or image and are indivisible.

10. The method of claim 1, wherein implementing the ladder of abstraction involves a dynamic exchange of information between large-scale analysis and small scale analysis, wherein the large-scale analysis may restrict the number of possible interpretations of small scale elements and identification of the small scale elements corroborate the validity of an interpretation of large scale elements.

11. The method of claim 1, wherein in implementing the ladder of abstraction, creation of order results from an upward motion and a downward motion enables the determination of a particle when only one shape is detected.

12. The method of claim 1, wherein in implementing the downward motion on the ladder of abstraction, physical elements of the image are promoted by association before the identity of the physical entity can be resolved by another means.

13. The method of claim 12, wherein promotion by association includes adjusting a feature further down the ladder of abstraction to reveal a feature that is at least partially obscured.

14. The method of claim 1, further comprising using a shape of shape method to analyze a geometric shape obtained from analysis of the object or activity according to relative interrelationships between nodes.

15. The method of claim 1, wherein a shape characterization method is applied recursively to a tree structure arising from a physical image to interpret the tree structure as a geometrical entity.

16. A non-transitory computer readable medium having instructions stored thereon that, if executed on a computing device, causes the computing device to perform a method, comprising:
    acquiring an electronic image and forming at least one Grenze Set including pixels of the electronic image;
    applying vocabulary elements and rules associated with a primitive using a decision tree to evaluate pixels of the Grenze Set;
    explaining pixels of the Grenze Set by re-building the Grenze Set using a set of sub-primitives; and
    applying higher order analyses to the Grenze Set according to a ladder of abstraction to assemble pixels into at least one of objects or activities that are meaningful to a user.

17. The computer readable medium of claim 16, wherein the explaining comprises performing error corrections on the Grenze Set and determining a set of sub-primitives arranged to best fit the Grenze Set.

18. The computer readable medium of claim 17, wherein the performing error correction comprises omitting pixels from the primitive that do not conform to applied rules, wherein a resulting Grenze Set is punctuated and divided into at least one set of pixels that can be explained as a certain shape and at least one set of pixels that do not fit into the shape.

19. The computer readable medium of claim 16, wherein the acquiring further comprises determining physical elements of the image from physical measurements of the image, the physical elements including pixels of the image.

20. The computer readable medium of claim 16, wherein implementing the ladder of abstraction involves a dynamic exchange of information between large-scale analysis and small scale analysis, wherein the large-scale analysis may restrict the number of possible interpretations of small scale elements and identification of the small scale elements corroborate the validity of an interpretation of large scale elements.

21. The computer readable medium of claim 16, wherein in implementing the ladder of abstraction, creation of order results from an upward motion and a downward motion enabling the determination of a particle when only one shape is detected.

22. The computer readable medium of claim 16, wherein in implementing the downward motion on the ladder of abstraction, physical elements of the image are promoted by association before the identity of the physical entity can be resolved by another means.

23. The computer readable medium of claim 22, wherein promotion by association includes adjusting a feature further down the ladder of abstraction to reveal a feature that is at least partially obscured.

24. The computer readable medium of claim 16, wherein the method further comprises using a shape of shape method to analyze a geometric shape obtained from analysis of an object or activity according to relative interrelationships between nodes.

25. The computer readable medium of claim 16, wherein a shape characterization method is applied recursively to a tree structure arising from a physical image to interpret the tree structure as a geometrical entity.

* * * * *